United States Patent
Rodgers

[15] 3,661,721
[45] May 9, 1972

[54] COMPACT MULTISTAGE DISTILLATION APPARATUS HAVING STACKED MICROPOROUS MEMBRANES AND IMPERMEABLE FILMS

[72] Inventor: Franklin A. Rodgers, Brookline, Mass.
[73] Assignee: Pactide Corporation, Cambridge, Mass.
[22] Filed: Feb. 5, 1971
[21] Appl. No.: 112,854

Related U.S. Application Data

[63] Continuation-in-part of Ser. No. 838,769, July 3, 1969, abandoned, and a continuation-in-part of Ser. No. 838,872, July 3, 1969, abandoned.

[52] U.S. Cl. ........................202/172, 202/186, 202/236, 203/10, 159/DIG. 27, 55/158
[51] Int. Cl. ............................................B01d 3/02
[58] Field of Search ....................202/172, 186, 236; 203/10, 203/11; 159/DIG. 27; 210/23; 161/55, 133, 136, 161; 55/16, 158

[56] References Cited

UNITED STATES PATENTS

| | | | |
|---|---|---|---|
| 624,828 | 5/1899 | Lantzke | 161/136 |
| 2,043,988 | 6/1936 | Brown | 161/136 X |
| 2,406,815 | 9/1946 | Elfving | 161/136 |
| 2,758,083 | 8/1956 | Van Hoek et al. | 210/38 X |
| 3,240,683 | 3/1966 | Rodgers | 202/173 |
| 3,340,186 | 9/1967 | Weyl | 203/10 X |
| 3,385,769 | 5/1968 | Brose | 202/236 X |
| 3,469,372 | 9/1969 | Yamauchi et al. | 55/158 |
| 3,520,803 | 7/1970 | Iaconelli | 159/DIG. 27 |
| 3,563,860 | 2/1971 | Henderyckx | 202/172 |

Primary Examiner—Norman Yudkoff
Assistant Examiner—David Edwards
Attorney—Brown & Mikulka and Robert E. Corb

[57] ABSTRACT

A still comprising a distillation unit formed by arranging microporous membranes and corrugated, impermeable films in alternating stacked relation together with adhesive sealing elements located between adjacent membranes and films and a spacer located between two stacks of membranes and films, to form channels for liquids. The assembly of membranes, films, sealing elements and spacer is subjected to heat and pressure to bond the sealing elements to the membranes, films and spacer, and holes are drilled through the unit to form conduits for feeding liquids to and from selected channels between adjacent membranes and films. The unit is then located together with sealing elements between the walls of two complimentary housing sections which are sealed to one another to form a housing enclosing the unit and subjected to heat and pressure to bond the unit to the walls of the housing to form additional liquid channels. The corners of the distillation unit are sealed to the corners of the housing to form chambers for receiving and distributing feed, heating, and coolant liquids. All of the components are designed to be fabricated or formed of polymeric sheet materials and connections for the flow of liquids are made to the conduits within the still (housing) by way of nipples secured to the housing and/or liquid conduits pressed into liquid-tight engagement with the housing. One surface of each member is corrugated to prevent blockage of the channels for feed liquid and the walls of the housing as well as the spacer are corrugated to provide channels for heating and coolant liquids.

25 Claims, 10 Drawing Figures

INVENTOR.
FRANKLIN A. RODGERS

INVENTOR.
FRANKLIN A. RODGERS
BY Brown and Mikulka
and
Robert E. Corb
ATTORNEYS

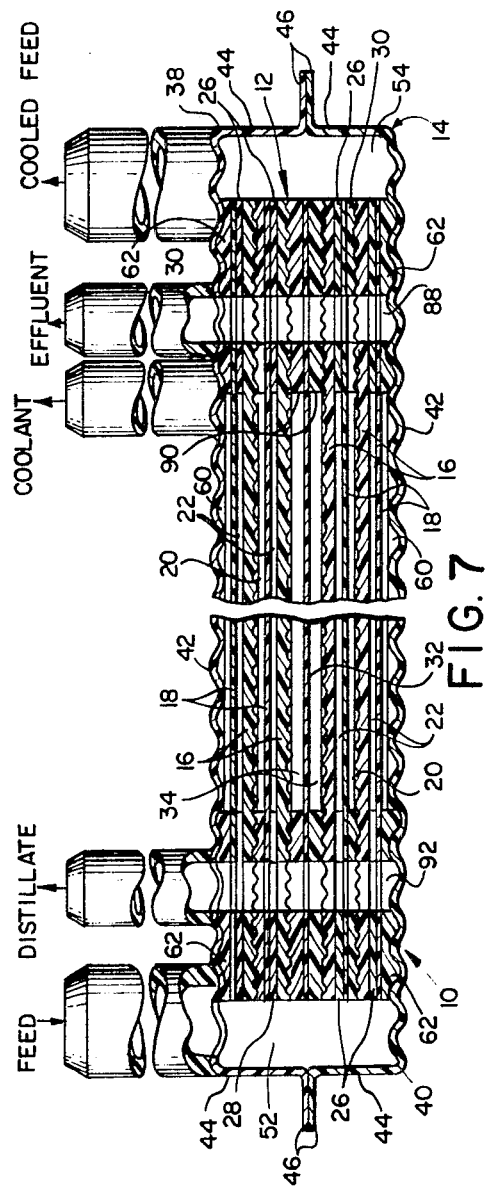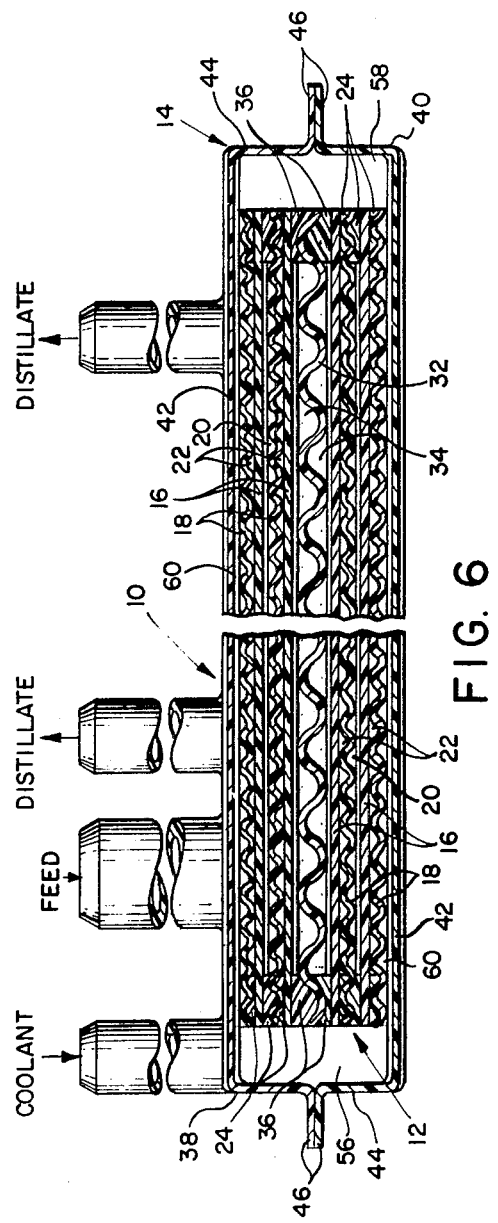

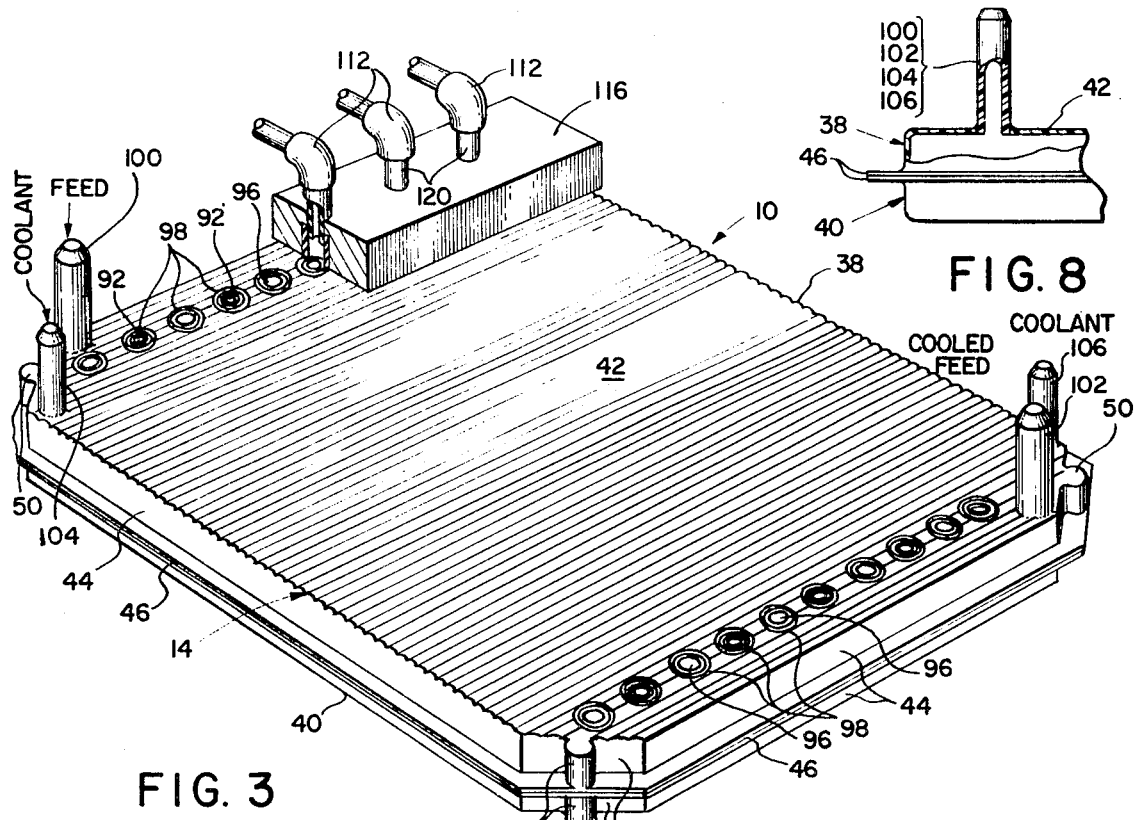
FIG. 8
FIG. 3
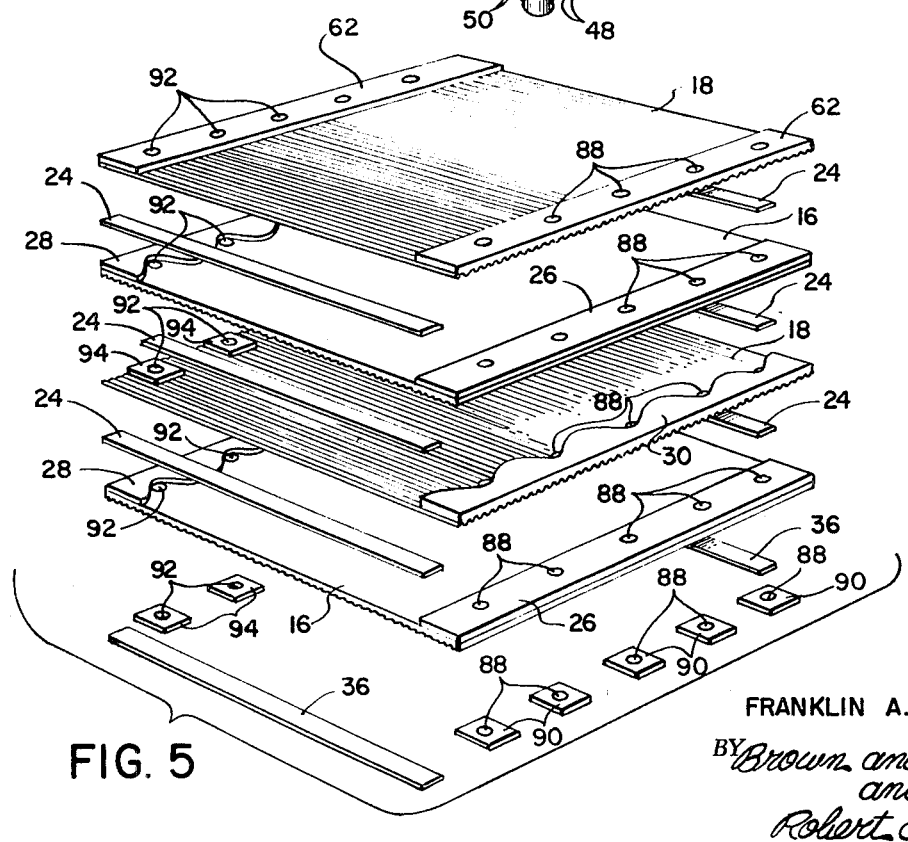
FIG. 5
INVENTOR.
FRANKLIN A. RODGERS
BY Brown and Mikulka
and
Robert E. Corb
ATTORNEYS 3,661,721

COMPACT MULTISTAGE DISTILLATION APPARATUS HAVING STACKED MICROPOROUS MEMBRANES AND IMPERMEABLE FILMS

This application is a continuation-in-part of my copending applications Ser. Nos. 838,769 and 838,872, both filed July 3, 1969, and now abandoned.

BACKGROUND OF INVENTION

This application relates to novel distillation apparatus incorporating microporous membranes and a method of fabricating and assembling such apparatus.

A number of U. S. patents and copending applications disclose distillation systems and processes particularly adapted to the demineralization, e. g. desalination, of water, in which a feed or distilland liquid such as salt water is circulated in contact with one side of a microporous membrane permeable to the vapor of the liquid and impermeable to the liquid itself under the operating conditions. A distillate liquid, e. g. distilled water, is maintained in contact with the opposite side of the membrane. Heat is transferred to the distilland liquid to vaporize it while heat is transferred from the distillate liquid to cause the vapor of the liquid to pass through the membrane and be condensed as distillate. Multiple stage distillation systems are described in which the heat from the distillate of each stage is transferred to the distilland of a succeeding stage and so forth. In systems of this type, several membranes or sections thereof are arranged in stacked relation with alternate barriers which cooperate to form channels on opposite sides of each membrane for distilland and distillate liquids. Distillation methods of this type are described in applicant's U.S. Pat. Nos. 3,406,096, 3,477,517, and 3,497,423; U.S. Pat. No. 3,340,186; and in applicant's copending application Ser. No. 524,366, filed Dec. 27, 1965.

A preferred embodiment of the distillation apparatus disclosed in applicant's aforementioned patents and application includes a multiple stage distillation unit in which both the microporous membranes and the spacers are formed of polymeric materials, the spacers being in the form of thin films. Suitable materials for the membranes are those which lend themselves to the formation of microporous membranes having a high proportion of voids, e. g. 70 to 80 percent, and uniform pore distribution and which are either inherently poorly wettable or non-wettable, e. g. hydrophobic, by the distillate liquid or can be treated to render them poorly wettable or non-wettable by the liquid. Examples of polymers particularly adapted to the formation of membranes useful in water desalination are disclosed in the aforementioned patents and application and include the fluorocarbons such as polytetrafluoroethylene and polyvinylidene fluoride are preferred because they are inherently poorly wettable by water. Methods of manufacturing microporous membranes of this type are known in the art and include solvent—non-solvent systems such as disclosed for example in the copending U. S. patent application of James L. Bailey et al, Ser. No. 790,192 filed Jan. 3, 1969, as a continuation-in-part of and replacement for Ser. No. 577,593, filed June 16, 1966, and now U.S. Pat. No. 3,470,167. Polymeric materials useful as the barrier films are selected according to criteria including compatibility with the liquids involved, cost, ease of fabrication and assembly, useful operating temperatures and thermal conductivity. Polymers particularly suited for water desalination include polycarbonates, polyesters, polyethylene, polypropylene and halogenated polyethylenes, particularly the fluorocarbons.

In a distillation unit of this type, the barrier films are corrugated to provide channels for the flow of distillate and distilland liquids in contact with opposite sides of the porous membranes which are secured to adjacent barrier films in selected regions particularly at the edges of the membranes and/or barrier films to control the circulation of the liquids and confine the liquids to their proper channels. In a typical distillation system such as disclosed in the aforementioned patents and applications, the membrane and barrier films are rectangular and stacked with their edges in alignment and secured to one another adjacent their edges to form a parallelepiped shaped unit. This unit comprising the membranes and films is coupled with external means for introducing liquids into and withdrawing liquids from the unit, means for transferring heat to the unit and means for transferring heat from the unit. To conduct particular liquids to selected channels within the unit, aligned holes are provided through the stacked membranes and films and a selected channel is blocked in regions surrounding the aligned holes in the membrane and film defining said channel in order to prevent the flow of liquid into or from the selected channel through the holes in the membrane and film. The external means for introducing into and withdrawing liquids from the unit as well as transferring heat to and from the unit generally comprise a pair of plates or headers between which the stack of membranes and films comprising the unit are engaged, together with liquid conduit means such as manifolds, coupled with the holes in the outer films of the unit for introducing and withdrawing liquids means for heating one of the headers and means for cooling the other header. Thus, a still of this type constructed according to the prior art comprises a unit formed of stacked membranes and films enclosed at least on two sides by heating and cooling elements as well as liquid conducting means for coupling holes in the unit with external accessories such as circulating pumps, heat exchangers, liquid pretreatment devices, and the like.

Objects of the invention are: to provide a novel and improved multiple stage still of the type described in which the membranes, barrier films, heat transfer means and the liquid conduits are all formed as a single unit; to provide a novel and improved multiple stage still as described formed entirely of polymeric materials, primarily in sheet form; to provide a novel and improved multiple stage still adapted to be readily and easily coupled with external accessories such as, particularly, means for transferring heat and liquids to and from the still; and to provide a still as described characterized by an inexpensive and a simplified construction facilitating rapid and easy fabrication and assembly.

Another object of the invention is to provide a novel and improved method of fabricating and assembling a still of the type described.

Other objects of the invention will in part be obvious and will in part appear hereinafter.

The invention accordingly comprises the apparatus possessing the construction, combination of elements and arrangement of parts, and the method involving the several steps and the relation and order of one or more of such steps with respect to each of the other which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 3 is a perspective view of another embodiment of the still.

FIG. 5 is an exploded, perspective view of components of the still shown in FIG. 4, illustrating the method of fabrication and assembly;

FIG. 6 is an enlarged, elevational, sectional view of the still taken substantially along the line 6—6 of FIG. 2;

FIG. 7 is a view similar to FIG. 5, the section being taken substantially along the line 7—7 of FIG. 2;

FIG. 8 is an elevational view of a portion of the distillation system illustrating the details thereof;

Figure 1:
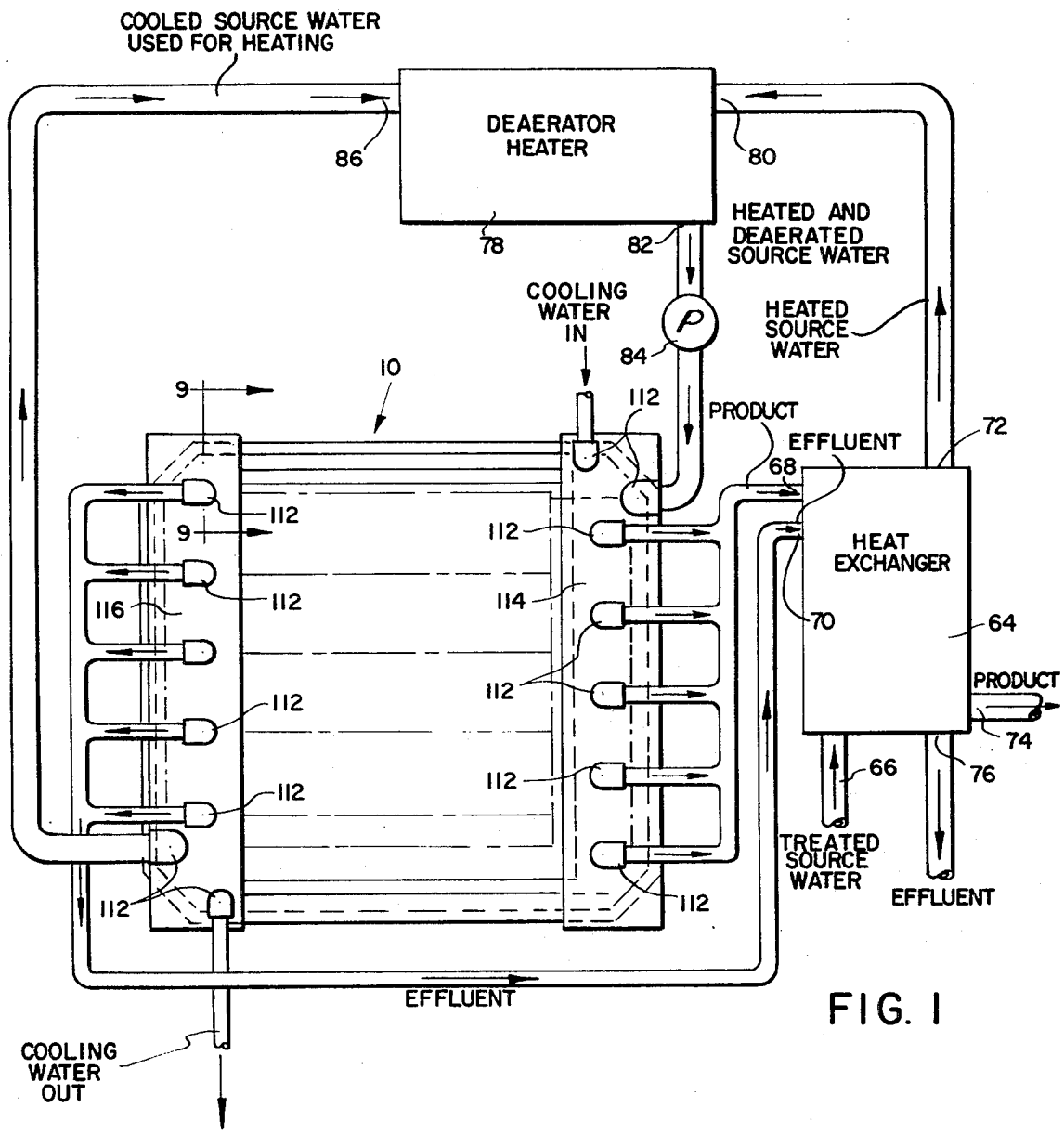
FIG. 1 is a somewhat schematic illustration of a distillation system embodying a still constructed in accordance with the invention.
Figure 2:
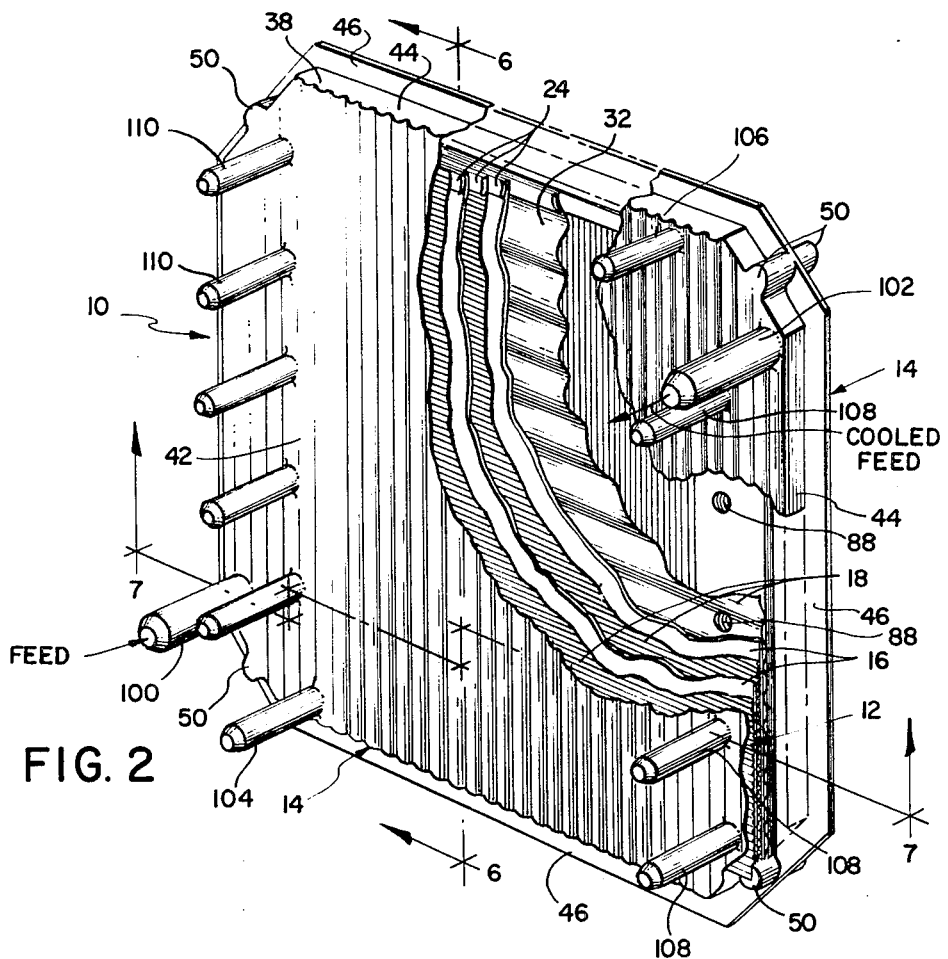
FIG. 2 is a perspective view of a still embodying the invention shown partially in section with parts broken away.
Figure 4:
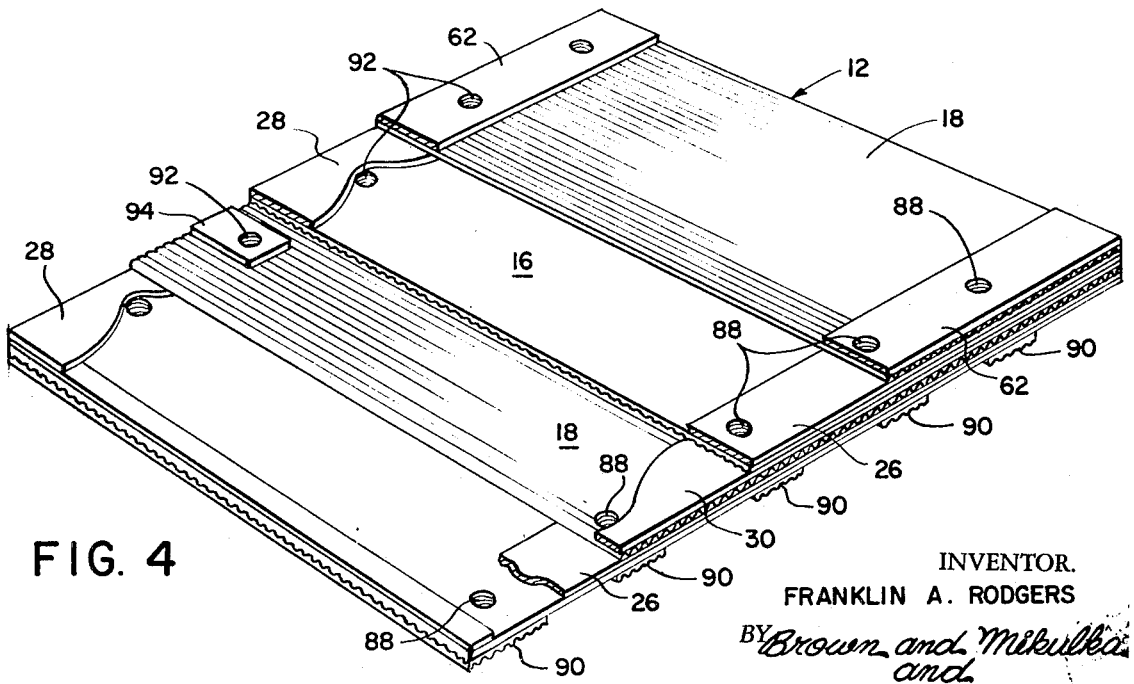
FIG. 4 is a perspective view of components of the stills of FIG. 2 and 3 shown with parts broken away.

Reference is now made to FIGS. 1 through 3 of the drawings wherein there is illustrated a multiple stage distillation system and still embodying the invention. The distillation system shown in FIG. 1 includes a still generally designated 10, including, as basic components thereof, a multiple stage distillation unit 12 composed of a multiplicity of porous membranes and barrier films secured together in stacked relation and enclosed in a housing designated 14. The distillation unit 12 comprises a multiplicity of sheet-like elements all substantially rectangular, having the same dimensions and arranged with their edges in alignment so that unit 12 takes the form of a relatively thin parallelepipedon.

The components of unit 12 include a multiplicity of microporous, vapor permeable membranes 16 and liquid and vapor impermeable barrier films 18. The membranes and barrier films are arranged in face-to-face relation in alternating order to form two rectangular stacks which are joined together in a manner to be described to form unit 12. Each membrane 16 is preferably formed with a smooth or plane surface and another surface having a corrugated appearance, being formed with alternating parallel depressions and raised sections having a generally sinusoidal configuration. As previously noted, each membrane is formed with a high proportion, e. g. on the order of 80 percent, of microscopic through passages or pores for conducting the vapor of a liquid, such as water, while preventing the passage of liquid by capillary action. Although polymeric materials useful for the membranes and methods of manufacture are disclosed in the aforementioned patents and applications, particular mention should be made of polyvinylidene fluoride as a preferred membrane material and the so-called "solvent-non-solvent" casting process as the preferred method of forming the membrane, such processes having been described in U. S. Pat. Nos. 1,421,341, 3,100,721, and 3,208,875 as well as the aforementioned Bailey et al applications.

Although the construction and composition of barrier films 18 is described in the aforementioned patents and application, it should be noted that the preferred polymeric material for the barrier films is a polycarbonate such as sold by General Electric Co. under the trademark "Lexan." Films 18 are corrugated so that when interposed between adjacent porous membranes 16, as shown in FIGS. 6 and 7, the corrugations will contact the surfaces of the porous membranes forming channels for the flow of liquids in contact with the membranes. As indicated in the drawings, the corrugated barrier films 18 cooperate with porous membranes 16 to form a multiplicity of distilland channels 20 each bounded on one side by a microporous membrane and through which a feed or distilland liquid such as salt water is cirulated; and a multiplicity of distillate channels 22 bounded by the opposite sides of the membranes in which vapor of the distilland liquid is condensed to form distillate liquid.

The essential components of a distillation stage of the still include a microporous membrane 16 through which the vapor of the distilland is transferred and means such as barrier films 18 cooperating with the membrane to form distillate and distilland channels. For the purpose of clarity of illustration, the thickness of the components have been exaggerated and the still is shown in the drawings as including only four distillation stages. However, it should be understood that in actual practice, such a still would normally comprise a very large number of distillation stages, for example, as many as 180. The actual number of stages, however, will depend upon the temperature differential between the hottest and coldest stages and the temperature differential between succeeding stages. In the multiple stage still, (see FIGS. 6 and 7) heat is transferred to the distilland liquid in the distilland channel (or channels) 20 of the first or hottest stage (or stages) to vaporize the distilland liquid. Heat is transferred from the distillate liquid of the last or coldest stage (or stages) of the still to condense the vapor transferred through the adjacent membrane to form distillate in a distillate channel 22. In each stage, energy is transferred as flux, i. e. vapor, through the porous membrane and then transferred by conduction through the adjacent barrier film from the distillate to the distilland liquid of the next succeeding stage. In the preferred form shown in the drawings, the still comprises two series of distillation stages with the first or hottest stages being located innermost and successive cooler stages arranged outwardly therefrom. Thus, distillation unit 12 comprises two inner porous membranes 16 and, alternating outwardly therefrom, barrier films 18 and additional porous membranes, four membranes and four barrier films being illustrated in the drawings.

The distillate and distilland are formed and separated from one another to confine and conduct the flow of the liquids within the channels by damming or blocking the channels in selected regions. The channels are dammed or blocked by sealing elements located within the channels between adjacent membranes and barrier films and bonded to the facing surfaces of the membranes and films. The distilland channels are located on the inner or hot side of each microporous membrane 16 and the distillate channels are located on opposite sides of the membranes from the distilland channels. The channels are blocked in such a way that the flow of the distilland and distillate liquids is in parallel directions from end-to-end of unit 12 and in the form shown, sealing elements 24 are bonded to the opposite lateral margins of adjacent membranes and barrier films to prevent the admission or escape of liquids from the distilland and distillate channels at the sides thereof. The distillate channels 22 are blocked at opposite ends by sealing elements 26 and 28 secured between and to the end marginal surfaces of adjacent membranes and barrier films between the cold side of each membrane and the hot side of the adjacent barrier film. The distilland channels 20 are blocked at one end, termed the exit end, by sealing elements 30 also bonded to the end marginal surfaces of adjacent membranes and barrier films. The opposite ends of the distilland channels remain open at the edges of the membranes to permit the introduction of distilland liquid into the distilland channels.

Means are provided for introducing a liquid into or withdrawing a liquid from a particular channel at or near the end thereof at which the channel is blocked. These means include outlets or conduits provided by holes formed in alignment through the stack of membranes, barrier films and sealing elements. Where the hole is formed in a sealing element within a particular channel, there is no communication between the channel and the hole because the channel is blocked in regions surrounding the hole. However, where the channel remains unblocked in regions surrounding the hole, there will be communication between the hole and the channel. In this way, each group of aligned holes through stacked membranes, films, and sealing elements forms a conduit communicating with selected channels.

Distillation unit 12 comprises two sets of membranes and barrier films secured together in face-to-face stacked relation by sealing elements bonded to the membranes and barrier films. Each of these stacks, one of which is shown in exploded form in FIG. 5, is bounded on one face by a microporous membrane 16, on its opposite face by a barrier film 18 and includes a multiplicity (one of each are shown) of barrier films and membranes arranged in alternating order between the outer membrane and barrier film. A pair of these stacks are arranged with membranes 16 in spaced face-to-face relation separated by corrugated spacer 32. Spacer 32 is formed of a liquid and vapor impermeable polymeric sheet material such as a polycarbonate and is corrugated so as to cooperate with the adjacent membranes 16 to form heating channels 34 through which a heating liquid is circulated for transferring heat to the still to help establish thermal gradients from the inside of the still outwardly towards the exterior thereof. The thickness of the sheet material comprising spacer 32 may be substantially greater than the thickness of the sheet material comprising barrier films 18 and the corrugations in spacer 32 are substantially deeper, e. g. have a greater amplitude than the corrugations in barrier films 18, so that the flow capacity of channels 34 is substantially greater than the flow capacities of channels 20 and 22 defined by the corrugations in the barrier films. The corrugations of spacer 32 are parallel with the corrugations of the barrier films, and spacer 32 is secured to the adjacent membranes 16 and channels 34 are blocked at their lateral edges by sealing elements 36. By virtue of this construction, a heating liquid can be introduced into channels 34 at one end edge of the stack and withdrawn from the channels at the opposite end edge thereof after giving up heat to the liquids within the distillate and distilland channels during its passage through channels 34. In the preferred embodiment of the invention, the heating liquid is the feed or distilland liquid, e. g. salt water, so that a portion of the heating liquid circulated through channels 34 is transferred as vapor through the microporous membranes 16 defining the sides of the heating channels.

Distillation unit 12 is enclosed within a housing 14 providing for circulation of the various liquids including the feed liquid utilized both for heating as the distilland, and the cooling liquid. In the form shown in FIGS. 2, 3, 6 and 7, housing 14 comprises first and second complementary sections 38 and 40, each having a generally rectangular main wall 42 and dependent side walls 44 each formed with a flange 46. Housing sections 38 and 40 are secured to one another at flanges 46 to form a shallow chamber having length and width dimensions exceeding the length and width of unit 12 and a depth dimension, measured between main walls 42, approximately equal to the dimensions of unit 12. To facilitate fabrication and assembly, housing sections 38 and 40 are preferably identical in size, shape and conformation. Thus, only one set of tools is required and selective assembly is made unnecessary.

The corners of the housing are chamfered to form dependent corner walls designated 48 disposed at 45° angles with respect to dependent side walls 44 and including projecting sections 50 for receiving the corners of unit 12 located within the chamber provided by housing 14. A sealant adapted to adhere to the housing sections and the edges of distillation unit 12 is introduced into projecting sections 50 to form a seal between the corners of unit 12 and corner walls 48 of the housing to form chambers between the side walls of the housing and the edges of unit 12, these chambers being designated first, second, third, and fourth and numbered 52, 54, 56, and 58, respectively. First chamber 52 is located at the edge of unit 12 at which distilland channels 22 are unblocked or open while second chamber 54 is located at the opposite side of unit 12 where all of the channels, except heating channels 34 are blocked. Thus, feed or distilland liquid introduced into first chamber 52 will enter and flow through distilland channels 20 and heating channels 34 toward the opposite side of the unit. The portion of the heated distilland liquid which passes through the heating channels 34 and is cooled during its passage, is collected within fourth chamber 54 from which it is conducted from the still.

First and second chambers 56 and 58 are located at the other two sides of the still; that is, at the sides thereof at which all of the distilland, distillate, and heating channels are blocked and in cooperation with main walls 42, provide coolant channels designated 60 through which a coolant liquid may be circulated in contact with outer barrier films 18 of unit 12. Main walls 42 are formed with corrugations similar to those in spacer 32 and disposed at right angles to the latter so as to cooperate with outer barrier films 18 to form coolant channels 60. The coolant channels are blocked at their sides to prevent flow of liquid into and from third and fourth chambers 56 and 58 by sealing elements 62 bonded to the facing surfaces of outer barrier films 18 and main walls 42 at the end margins of the outer barrier films. By virtue of this construction, a coolant liquid introduced into third chambers 56 will be conducted through channels 60 against the outer surfaces of unit 12 to fourth chamber 58 from which the coolant liquid may be withdrawn, thus establishing thermal gradients across sections of unit 12 between heating channels 34 and coolant channels 60.

Still 10 is a component of a distillation system illustrated somewhat schematically in FIG. 1 including means for supplying and circulating heating, cooling, and distilland liquids to and through the still; means for treating the feed liquids; and means for transferring heat to and from the various liquids. The preferred system shown is specially designed to produce distilled water from source water containing dissolved solids such as salts, and includes a conventional heat exchanger 64 into which a feed liquid such as pretreated saline water from a suitable source is introduced at inlet 66. The hot product or distillate, e. g. distilled water, and the hot effluent, e. g. concentrated salt water, withdrawn from still 10 are introduced into heat exchanger 64 at respectively inlets 68 and 70 and are circulated through the heat exchanger to transfer heat to the treated source water which is withdrawn from the heat exchanger at outlet 72. The cooled product and effluent are discharged from the heat exchanger through respectively outlets 74 and 76. The pretreatment of the source liquid, for example salt water, may be conventional and performed in a known manner. It will usually include filtration to remove solid matter and chemical treatment to remove scale-producing agents such as sulfates and carbonates.

In the distillation system illustrated in FIG. 1, the heated feed liquid from the heat exchanger is introduced into a deaerator heater 78 through an inlet 80 where, in the case of water, the feed liquid is heated to its boiling point and noncondensable gases such as air are removed from the liquid. The heated and deaerated feed liquid is withdrawn from the deaerator heater through outlet 82 and circulated by a pump 84 to and through the still wherein a portion of the heated feed liquid is circulated as distilland, while another portion thereof is circulated through channels 34 as the heating liquid to help establish and maintain the requisite temperature gradients within the still. During passage of the heating liquid through channels 34, vapor will pass from the liquid through innermost membranes 16 to form distillate resulting in a relatively small increase in the concentration of dissolved solids, e. g. salt, in the heating liquid while the temperature of the liquid will be reduced below the temperature at which it entered. The cooled heating liquid, as it exits from the heating channels, has a substantial value by virtue of both its pretreatment and heat content and accordingly recirculated to the deaerator where it is introduced at inlet 86. The increase in salt concentration of the recirculated heating liquid is relatively small and the quantity of the recirculated feed liquid is small relative to the quantity of new or additional feed liquid introduced in the deaerator heater, so that the salt concentration of the heated and deaerated feed water introduced into the still by way of pump 84 will be only slightly greater than that of the source water alone and will not effect the operation of the still. On the other hand, the utilization of the valuable heating liquid and the conservation of the heat energy by virtue of the recirculation of the heating liquid coupled with the transfer of heat from the product and effluent to the feed liquid will result in a substantial cost-savings and increase operating efficiency of the system.

The structure of the still is especially designed to facilitate fabrication and assembly of the components as well as to optimize liquid transfer, heat exchange, and free flow of liquids particularly insofar as these factors effect efficiency. With regard to fabrication and assembly of still 10, all of the components thereof are preformed or fabricated as sheets and films so that assembly is essentially a positioning and stacking operation followed by the application of heat and pressure to the assembly to bond the elements to one another to form an integral unit 12 which is then sealed within the housing. The membranes 16, barrier films 18, and sealing elements are constructed and positioned to provide for the necessary channels and conduits for the various liquids and to reduce resistance to flow of the liquids.

In the operation of the still, the heated distilland liquid, e. g. saline water, is caused to flow through the distilland channels between adjacent membranes and barrier films in a direction parallel with the direction of the corrugations of the barrier films. The distillate or product is formed by condensation of vapor in the distillate channels and in the preferred from of still shown, is withdrawn from the end of the still at which the distilland liquid is introduced so that flow of distillate is counter to flow of distilland. The distilland liquid is introduced into the distilland channels at one end of unit 12 from chamber 52 and flows through the distilland channels to conduits 88 formed by aligned holes also designated 88 in the membranes 16, barrier films 18 and sealing elements bonded together by the sealing elements including elements 26 and 62, as well as additional sealing elements 90 located within heating channels 34 and bonded to the opposite surfaces of spacer 32 and the adjacent surfaces of membranes 16. Sealing elements 90 are spaced from one another to permit flow of the heating liquid through the heating channels into second chamber 64 while blocking the channels in regions surrounding conduits 88 thereby preventing flow of the heating liquid into conduits 88.

Similar conduits 92 are provided at the opposite end of the still for withdrawing distillate liquid from the distillate channels 22. Conduits 92 are constituted by the walls or holes, also designated 92, formed in the membranes, barrier films, and sealing elements 62 and additional sealing elements 94, similar to elements 90, provided within the distilland channels 20 and heating channels 34. Elements 94 function to block the channels in regions surrounding conduits 92 to prevent the flow of the feed liquid into conduits 92 through which the distillate is withdrawn from the distillate channels. Conduits 88 and 92 are offset from one another so that each of conduits 88 is aligned with a space between a pair of conduits 92 and vice versa for reasons which will appear hereinafter. It will be noted that sealing elements 28 and 30, which block the ends, respectively, of the distillate and distilland channels are formed with indentations such that conduits 88 and 92 open into the distilland and distillate channels respectively. It will also be apparent that because of the spacing of the conduits formed through the membranes, barrier films and sealing elements, there is required to be some flow of the distillate and distilland liquids transverse to the direction of the corrugations in barrier films 18. To facilitate this lateral flow, the indentations in each of sealing elements 28 and 30 are separated by projecting sections to form a dam having a sinusoidal edge configuration tending to guide the flow of the liquid toward conduits 88 and 92.

As previously noted, the surface of each porous membrane 16 defining one side of each distilland channel is formed with alternating ridges and grooves or corrugations, extending perpendicularly to the corrugations of barrier films 18. This construction is provided to reduce the possibility of blockages within the distilland channels due, for example, to scaling and to facilitate the flow of the distilland transverse to the barrier film corrugations in the regions of conduits 88. The transverse corrugations or grooves in the facing surfaces which bound each distilland channel 20 perform several functions tending to eliminate blockages due to scale build up and facilitating lateral flow. First, the transverse corrugations tend to increase turbulence within the distilland liquid which in turn tends to prevent scale accumulation and adherence thereof to the membrane and barrier film surfaces. Should any scale build-up occur within a channel formed by a groove in a barrier film, the grooves in the adjacent membrane will provide alternate paths of channels around the obstruction thereby eliminating regions of stagnant liquid in which the concentration of the scale producing agents might tend to build-up and produce additional scale. The turbulent flow and alternate channels provided between the transverse grooves also tend to prevent particulate matter from becoming lodged in the distilland channels and, in the event that a particle does become lodged in a distilland channel, provide alternate channels around the particle to prevent occurrence of stagnant regions tending to result in scale build-up. Still another function of the grooves in the porous membranes is to provide channels for the transverse flow of the distilland liquid in the regions of conduits 88. This is particularly important in these regions where the concentration of dissolved solids in and the temperature of the distilland is greatest thus making conditions more conducive to scale formation.

As previously noted, the sealing elements are preformed of an adhesive material adapted to bond to adjacent membranes, barrier films, the main walls of the housing and spacer 32. The sealing elements are preformed by casting a solution of a thermosetting adhesive to form a sealing element of the desired shape and thickness. Suitable sealing elements can be formed by solvent casting such materials as an acrylo nitrile phenolic rubber base adhesives such as sold by B. F. Goodrich Company under the designation A864-B, on a silicone release paper and air drying the adhesive solution to form a layer having a thickness of the order of 1 to 3 mils. The adhesive may either be cast in the desired shape or as a layer which, following drying, may be cut into sections of the desired size and shape.

The distillation unit 12 is then assembled by alternately positioning and stacking the membranes, barrier films, and sealing elements and spacer and then subjecting the stack of the assembled components to heat and pressure to activate and cure the adhesive thereby binding the membranes, films, and spacer to one another to form the various channels. Conduits 88 and 92 are then formed by the simple expedient of drilling through the unit, a conventional paper drill being suited for this purpose.

Except for connections between conduits 88 and 92 and chambers 52, 54, 56, and 58, the remainder of the assembly process involves locating unit 12 between housing sections 38 and 40 together with sealing elements 62 and subjecting the assembly, i.e. still 10, to heat and pressure to bond sealing elements 62 to main walls 42 of the housing. The flanges 46 of the two housing sections are secured to one another either by conventional methods such as the use of an adhesive or by welding. An adhesive or sealant in fluid form is introduced into projecting sections 50 to form a seal between the corner walls of the housing and the corners of unit 12 to divide the housing into chambers 52, 54, 56, and 58. Sealants suitable for this purpose include room temperature vulcanizing silicone rubbers having a low enough viscosity to permit introduction into projecting sections 50 by way of a hollow needle or syringe.

Figure 10:
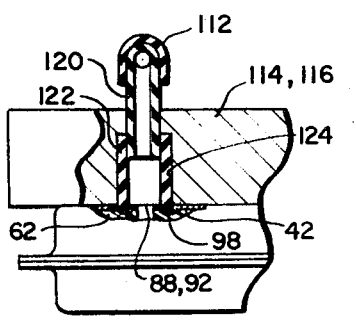
FIG. 10 is an elevational, sectional view similar to FIG. 9, illustrating another embodiment.
Figure 9:
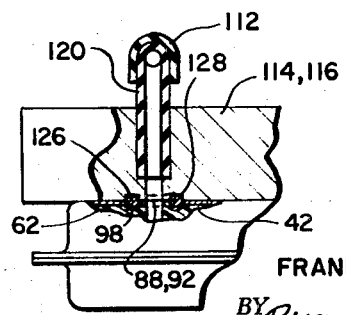
FIG. 9 is an elevational, sectional view of a portion of the distillation system of FIG. 1, the section being taken substantially along the line 9—9 of FIG. 1.

As illustrated in FIGS. 3, 9, 10, each main wall 42 is formed at opposite ends with a row of circular, flat areas 96 each surrounded by an annular groove 98. The flat areas 96 are arranged such that each of conduits 88 and 92 will underlie a flat area 96 when the distillation unit 12 is assembled within housing 14. Thus, there will be twice as many flat areas at each end of the still as there are conduits 88 and 92 so that the housing sections can be reversed end for end or additional conduits may be provided at either or both ends. To complete the still, holes are drilled through the flat area 96 so as to communicate with conduits 88 and 92.

A variety of means are provided for introducing liquids into and withdrawing liquids from still 10, specifically for introducing heated and deaerated feed liquid into first chamber 52, withdrawing the cooled and partially depleted heating liquid from second chamber 54, withdrawing the effluent liquid from distilland channels 20 by way of conduits 88, withdrawing distillate liquid from distillate channels 22 by way of conduits 92, introducing coolant liquid into third chamber 56, and withdrawing the coolant liquid from fourth chamber 58. These means are those structures which provide connections between external liquid conduits and main wall 42 of housing section 38 to couple the external conduits with internal conduits 88 and 92 and chambers 52, 54, 56, and 58. In the embodiment of still 10, illustrated in FIGS. 2 and 8, these connections are made by way of nipples or short tubes 102, 104, 106, 108, 110 attached to the main wall of housing section 38. Nipples 100, 102, 104, 106, 108 are secured to main wall 42 surrounding the openings therein for conducting the liquids into or from respectively chambers 52, 54, 56, and 58. Nipples 108 are secured to forward wall 42 surrounding holes 88 in the forward wall and nipples 110 are secured to the forward wall around holes 92. Since the feed input through nipple 100 is at a flow rate greater than the flow through any other nipple, the internal diameter thereof will be larger than the diameter of nipples 108 and 110 which may be substantially the same in embodiments in which the effluent flow rate approximates the product flow rate. The nipples may be formed of the same material as the housing and may be attached to the forward wall 42 in any conventional manner such as by welding or by a suitable adhesive. The nipples are connected to external conduits by conventional means such as elbows 112 formed of an elastomer or flexible polymer.

In the embodiment of the still shown in FIG. 3, the connections for the feed and cooled feed liquid, and coolant liquid are made by way of nipples 100, 102, 104, and 106 as described above. However, means are provided for making direct connection with conduits 88 and 92 without the necessity for attaching nipples 108, 110 to the forward walls. This construction has the advantage of making the connecting means a permanent part of the distillation system and facilitates replacement of still 10, the component of the entire system most likely to require replacement. These means for making connections to the still to provide for removal of effluent and product liquid are illustrated in FIGS. 1, 3, 9, and 10 and include blocks 114, 116 adapted to be clamped against main wall 42 overlying walls 88 and 92 respectively. Each of the blocks is formed with a plurality of bores 118 adapted to be aligned with holes 88 and 92 and a tube or nipple 120 is engaged in each bore 118 and projects therefrom so as to couple with an external conduit by way of an elbow 112.

Two alternate systems are shown for making a connection between a tube 120 and a portion of the forward wall comprising annular groove 98 surrounding each of holes 88 and 92. In the form shown in FIG. 8, these means comprise a tube 122 formed of an elastomer and engaged in a counterbore 124 in the block (114 or 116). Tube 122 projects beyond the surface of the block facing the main wall 42, and is held in liquid-tight engagement with the forward wall within annular groove 98 when the block is pressed against the main wall. In the embodiment shown in FIG. 9, a conventional O-ring 126 is provided in a counterbore or annular groove 128 surrounding bore 118 (in block 114 or 116) and is adapted to be pressed into sealing engagement with annular groove 98 in main wall 42 when the block is pressed against the main wall. This latter structure has the advantage of simplicity and the fact that the seal becomes more effective when the pressure is increased. Thus by virtue of this construction, all of the connections between the still and the external conduits for withdrawing effluent and product liquids from the still can be made simply by clamping blocks 118 against the still.

It will be seen from the foregoing that the distillation system described accomplishes the stated objects of the invention in that it provides a still structure which is relatively simple to fabricate and assemble to form a relatively complex liquid distribution system providing for the requisite heat exchange and temperature gradients; minimum resistance to liquid flow; poor conditions for scale formation; and optimum conditions for preventing flow blockages. The still structure is designed to permit fabrication entirely of polymeric materials in sheet form and provide for quick and easy connection to the other components of an overall distillation system including means for circulating liquids to and from the still.

Since certain changes may be made in the above process and apparatus without departing from the scope of the invention herein involved, it is intended that all matter contained in the above description or shown in the accompanying drawings shall be interpreted as illustrative and not in a limiting sense.

What is claimed is:

1. In distillation apparatus comprising a multiplicity of distillation stages each including a vapor permeable, liquid impermeable membrane and an impermeable film disposed in face-to-face relation with said membrane, said membranes and films of a plurality of said stages being rectangular and arranged in alternating order in stacked relation with their edges in substantial alignment, in combination:
   an external housing for enclosing the stack of said membranes and said films comprising said distillation stages, said housing comprising two complementary shaped housing structures formed of a liquid and vapor impermeable material, said structures including facing main walls and side walls dependent from said main walls joined to one another to form a chamber containing said stack and having dimensions exceeding those of said stack;
   means for securing said stack of membranes and films to said housing at the corners of said stack to form four peripheral chambers between the sides of said stack and said side walls of said housing; and
   means for introducing liquids into two of said peripheral chambers at adjacent sides of said stack and withdrawing said liquids from said peripheral chambers at the opposite sides of said stack to circulate said liquids through said apparatus.

2. Distillation apparatus as defined in claim 1 wherein said membranes, films and housing structures are formed of polymeric materials.

3. Distillation apparatus as defined in claim 1 wherein two of said impermeable films comprise the outer components of said stack, and said main walls of said housing structures are corrugated and cooperate with the outer impermeable films of said stack to form coolant channels for conducting a coolant liquid from a first of said peripheral chambers to a second peripheral chamber at the opposite side of said stack, said coolant channels being blocked at the edges of said stack adjacent the third and fourth peripheral chambers to prevent flow of liquid between the latter and said coolant channels.

4. Distillation apparatus as defined in claim 3 further including a corrugated sheet located between medial membranes of said stack dividing the latter into two sections containing at least approximately equal numbers of said membranes and films, said corrugated sheet cooperating with said medial membranes to provide heating channels for conducting a liquid between said sections of said stack from said third peripheral chamber to said fourth peripheral chamber, said heating channels being blocked at the edges of said stack adjacent said first and second chambers to prevent flow of liquid between the latter and said heating channels.

5. Distillation apparatus as defined in claim 4 wherein the corrugations in said main walls extend perpendicularly to the corrugations in said impermeable sheet.

6. Distillation apparatus as defined in claim 4, wherein said channels are blocked at the edges of said stack and around said openings by dams located within said channels and bonded to the membranes, films, walls and sheet defining said channels.

7. Distillation apparatus as defined in claim 3 wherein said films are corrugated to form channels for the passage of liquids in contact with opposite sides of said membranes and said corrugations in said films are substantially parallel with the corrugations in said sheet.

8. Distillation apparatus as defined in claim 7 wherein the depth of the corrugations in said sheet is several times the depth of the corrugations in said films.

9. Distillation apparatus as defined in claim 3 wherein said films are corrugated to form channels for the passage of liquids in contact with opposite sides of said membranes and said corrugations in said films are substantially perpendicular to the corrugations in said main walls.

10. Distillation apparatus as defined in claim 9 wherein each of said films cooperates with the adjacent membrane furthest from said sheet to form at least a distilland channel therebetween and said distilland channels are blocked at the edges of said stack adjacent said first and second peripheral chambers and are open at the other edges of said stack to permit circulation of liquid through said distilland channels between said third and fourth peripheral chambers.

11. Distillation apparatus as defined in claim 9 wherein each of said films cooperates with the adjacent membrane closest said sheet to form at least a distillate channel and said distillate channels are blocked at all of the edges of said stack to prevent liquid from entering or leaving said distillate channels at said edges.

12. Distillation apparatus as defined in claim 11 wherein said membranes, films, sheet and one of said main walls include aligned openings and all of said channels except said distillate channels are blocked in regions surrounding said openings for preventing passage of liquid through said openings and forming conduits coupled with said distillate channels for conducting liquid therefrom to the outside of said housing through said openings in said one main wall.

13. Distillation apparatus as defined in claim 12 wherein said channels are blocked at the edges of said stack and around said openings by dams located within said channels and bonded to the membranes, films, walls and sheet defining said channels.

14. Distillation apparatus as defined in claim 12 further comprising liquid conducting means including means for engaging the outer surface of said one main wall around the peripheries of said openings therein for making liquid-tight cells between said liquid conducting means and said housing.

15. Distillation apparatus as defined in claim 14 wherein said liquid conducting means include a manifold having a plurality of inlet openings and said resilient means are compressively engaged around said inlet openings and said openings in said one main wall between the latter and said manifold.

16. Distillation apparatus as defined in claim 15 wherein said manifold and said one main wall are formed with annular recesses surrounding the respective openings therein and said resilient means comprise O-rings engaged in said recesses.

17. Distillation apparatus as defined in claim 15 wherein said inlet openings in said manifold are in the form of counterbored holes and said resilient means include tubes formed of a compressible material seated in the counterbored sections of said holes and retained in compressive engagement with one said main wall surrounding said openings therein.

18. Distillation apparatus as defined in claim 1 further including a corrugated sheet located between medial membranes of said stack dividing the latter into two sections containing at least approximately equal numbers of alternating membranes and films, said corrugated sheet cooperating with said medial membranes to provide heating channels for conducting a liquid between said sections of said stack from a first of said peripheral chambers to a second of said peripheral chambers, said heating channels being blocked at the edges of said stack adjacent the third and fourth peripheral chambers to prevent flow of liquid between the latter and said heating channels.

19. Distillation apparatus as defined in claim 18 wherein two of said impermeable films comprise the outer components of said stack and said main walls of said housing structures are corrugated and cooperate with the outer impermeable films of said stack to form coolant channels for conducting a coolant liquid from said third chamber to said fourth chamber, said coolant channels being blocked at the edges of said stack adjacent said first and second chambers to prevent flow of liquid between the latter.

20. Distillation apparatus as defined in claim 19 wherein said channels are blocked at the edges of said stack and around said openings by dams located within said channels and bonded to the membranes, films, walls and sheet defining said channels.

21. For use in distillation apparatus, a distillation unit comprising, in combination:
a microporous membrane impermeable to liquid and permeable to the vapor thereof, said membrane having one surface formed with a multiplicity of generally parallel ridges and depressions; and
a pair of vapor impermeable films disposed in contact with opposite surfaces of said membrane, said films being corrugated to provide channels between said films and said membrane and being arranged with the corrugations of said films perpendicular to said ridges and depressions in said membrane surface.

22. Distillation apparatus as defined in claim 21 wherein the other surface of said membrane is substantially smooth.

23. Distillation apparatus as defined in claim 21 wherein said ridges and depressions have a generally sinusoidal configuration.

24. Distillation apparatus as defined in claim 21 further including means for circulating a distilland liquid between one surface of said membrane and the adjacent film and causing said liquid to flow substantially in the direction of said corrugation transverse to said ridges and depressions.

25. Distillation apparatus as defined in claim 24 further including sealing element located between and bonded to the margins of said other surface of said membrane and the adjacent film for preventing escape of liquid from the channels defined by said membrane and the last-mentioned film at the edges of said membrane.

* * * * *